United States Patent [19]

Kobayashi et al.

[11] Patent Number: 4,836,339

[45] Date of Patent: Jun. 6, 1989

[54] DISC BRAKE HAVING SHIELD PORTIONS FOR SHIELDING A BOOT

[75] Inventors: Kinzo Kobayashi, Kanagawa; Shinichi Nakayama, Tokyo, both of Japan

[73] Assignee: Tokico Ltd., Kanagawa, Japan

[21] Appl. No.: 82,357

[22] Filed: Aug. 6, 1987

[30] Foreign Application Priority Data

Sep. 18, 1986 [JP] Japan ............................. 61-143428[U]

[51] Int. Cl.⁴ ...................... F16D 65/02; F16D 65/14; F16D 65/78
[52] U.S. Cl. ................................ 188/73.1; 188/73.45; 188/264 G; 277/212 FB
[58] Field of Search ................. 188/73.1, 73.44, 73.45, 188/250 B, 252, 258, 264 G, 370, 71.6; 277/212 FB, DIG. 4; 192/107 R, 107 C, 85 AA, 70.11; D12/180; 92/168, 248, 176; 74/18.2

[56] References Cited

U.S. PATENT DOCUMENTS

| | | | |
|---|---|---|---|
| 4,085,828 | 4/1978 | Thioux | 188/264 G X |
| 4,603,760 | 8/1986 | Myers | 188/264 G X |
| 4,709,789 | 12/1987 | Czich et al. | 188/73.44 |

FOREIGN PATENT DOCUMENTS 2165902 4/1986 United Kingdom ........... 188/264 G

Primary Examiner—Andres Kashnikow
Assistant Examiner—Robert J. Oberleitner
Attorney, Agent, or Firm—Wenderoth, Lind & Ponack

[57] ABSTRACT

A disc brake for a vehicle has a pair of friction pads which are disposed on each side of a disc. A shielding plate is provided in such a manner as to shield a boot which shields at least one slide portion. Thus, the boot is protected from sparks which are generated by contact between the disc and the pads, and the boot is thereby prevented from being burned and deteriorated.

4 Claims, 5 Drawing Sheets

DISC BRAKE HAVING SHIELD PORTIONS FOR SHIELDING A BOOT

BACKGROUND OF THE INVENTION

1. Field of the Invention

The present invention relates to an improvement in a disc brake for a vehicle.

2. Description of the Related Art:

Pads which are employed for a disk brake must endure high surface pressure, heavy loads and high temperatures and are therefore formed from materials that have high wear resistance and good heat resistance.

Accordingly, it has heretofore been common practice to employ asbestos-resin molded materials which are formed by employing asbestos as a base material and mixing it with a binder resin and various kinds of friction adjustors. However, semimetallic and metallic materials using metal wires as a basic material have recently been employed to reduce dust pollution and extend the life of such pads.

Metallic pads formed by using semimetallic or metallic materials as a base material suffer, however, from the following problems. Since the disc is also formed from a metallic material, when the disc and the pads come into contact with each other, sparks are generated. If these sparks adhere to the piston boot or pin boots of the disc brake, the piston or pin boots may be burned and deteriorated, which will result in breakage.

SUMMARY OF THE INVENTION

In view of the above-described problems of the prior art, it is a primary object of the present invention to provide a disc brake which is designed so that sparks which are generated by the contact between the disc and the pads are prevented from adhering to the piston boot or pin boots.

To this end, the present invention provides a disc brake having: a carrier secured to a non-rotary member of a vehicle; a pair of friction pads disposed on each side of a disc and retained by the carrier in such a manner that the pads are slidable in the axial direction of the disc; and a caliper retained on the carrier through caliper support pins so as to be slidable in the axial direction of the disc, the caliper having a cylinder portion that receives a piston in such a manner that the piston is slidable in the axial direction of the disc, the piston facing one of the pair of pads at the side thereof which is remote from the disc, and the caliper extending so as to straddle the disc in order to transmit force to the other of the pads, wherein the improvement comprises a shielding plate for shielding a boot that shields at least one slide portion, the shielding plate being provided in such a manner as to shield the boot from scattering matter generated by the contact between the disc and the pads.

The above and other objects, features and advantages of the present invention will become more apparent from the following description of the preferred embodiments thereof, taken in conjunction with the accompanying drawings.

DETAILED DESCRIPTION OF THE PREFERRED EMBODIMENTS

Embodiments of the present invention will be described hereinunder in detail with reference to the accompanying drawings.

Figure 3:
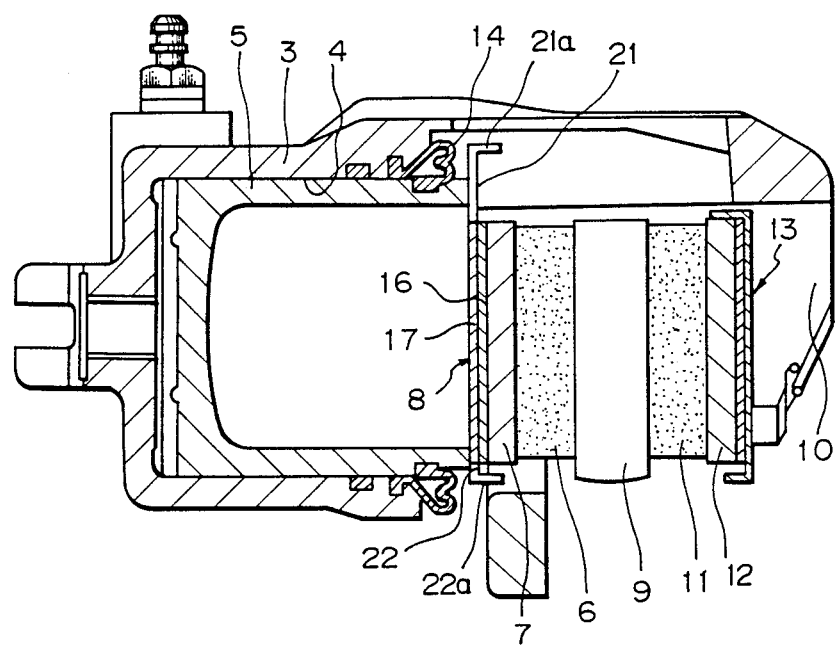
FIG. 3 is a longitudinal sectional view of a disc brake equipped with the shim shown in FIG. 1.
Figure 7:
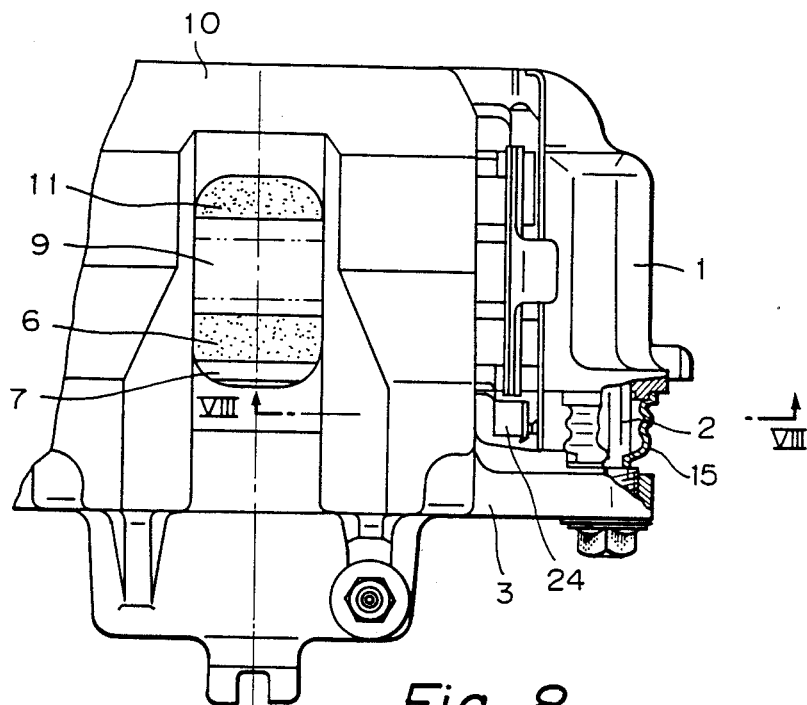
FIG. 7 is a plan view of a disc brake equipped with the shim shown in FIG. 6.

A disc brake is generally arranged as shown in FIGS. 3 and 7 which are a longitudinal sectional view and a plan view, respectively. More specifically, a carrier 1 is secured to a non-rotary member of a vehicle, and a caliper 3 is slidably retained on the carrier 1 by means of caliper support pins 2. A cylinder portion 4 is defined in the caliper 3, and a piston 5 is slidably provided in the cylinder portion 4. The piston 5 is brought into contact with a backing member 7 of an inner pad 6 through a shim 8. A bridge portion 10 is formed integrally with the caliper 3 in such a manner as to straddle a disc 9, and the bridge portion 10 is brought into contact with a backing member 12 of an outer pad 11 through a shim 13. It should be noted that the shims 8 and 13 are provided in order to prevent squeaking which would otherwise be caused by high-frequency vibrations generated at the area of contact between the disc 9 and the pads 6, 11 when the brakes are applied.

Further, a piston boot 14 is provided for the purpose of protecting the area of sliding contact between the cylinder portion 4 and the piston 5. The slide portion of each caliper support pin 2 is also protected by a pin boot 15.

An essential part of a first embodiment will next be explained.

Figure 1:
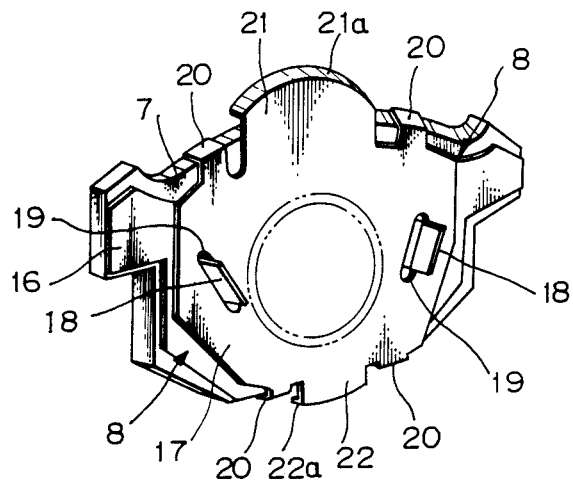
FIG. 1 is a perspective view of a shim in accordance with a first embodiment of the present invention, the shim being provided with shielding plates for protecting a piston boot.
Figure 2:
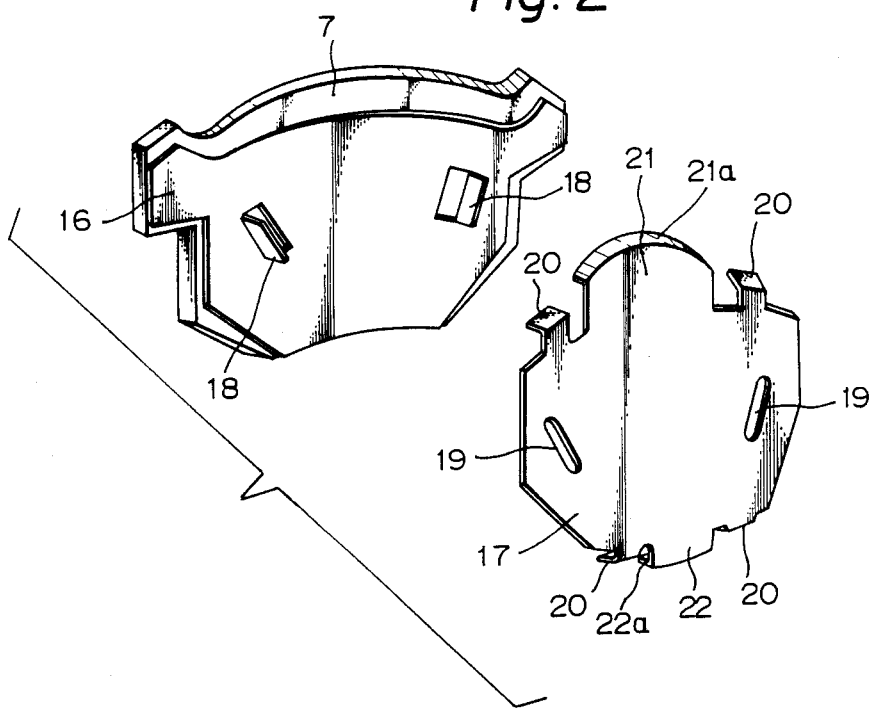
FIG. 2 is an exploded perspective view of the shim shown in FIG. 1.

Referring to FIGS. 1 and 2, the shim 8 consists of an elastic shim member 16 and a cover shim member 17. The elastic shim member 16 is attached to the backing member 7 and has projections 18 projecting from the side thereof which is remote from the disc 9. The cover shim member 17 is provided with fitting bores 19 for receiving the projections 18, respectively, of the elastic shim member 16, and a pair of resilient leg portions 20 disposed at each of the upper and lower ends of the shim member 17.

The cover shim member 17 is attached to the backing member 7 with the elastic shim member 16 sandwiched therebetween by clamping the backing member 7 between the upper and lower resilient leg portions 20.

Shielding plates 21 and 22 are provided integrally with the cover shim member 17 for the purpose of protecting the piston boot 14 from sparks generated by contact between the disc 9 and the inner pad 6. The shielding plates 21 and 22 are provided in such a manner as to extend upwardly and downwardly from those portions, respectively, of the shim member 17 with respect to which the piston boot 14 is disposed outwardly of the backing member 7, and the upper end portion 21a of the shielding plate 21 and the lower end portion 22a of the shielding plate 22 are bent toward the disc 9 (see FIG. 3).

Figure 4:
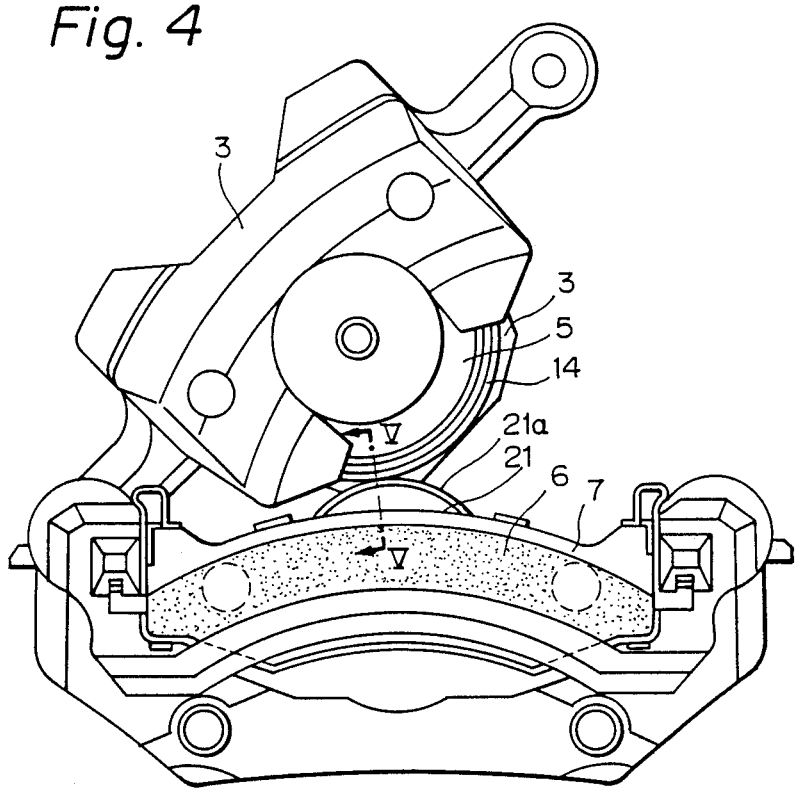
FIG. 4 is a side view showing the way in which the pads of the disc brake shown in FIG. 3 are replaced.
Figure 5:
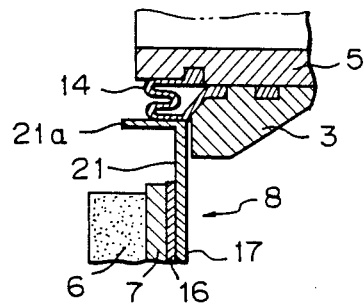
FIG. 5 is a sectional view taken along the line IV—IV of FIG. 4.

Thus, the shielding plates 21 and 22 intercept sparks and protect the piston boot 14 against sparks tending to adhere thereto, thereby preventing the piston boot 14 from being burned and deteriorated. The reason why the upper end portion 21a and the lower end portion 22a of the shielding plates 21 and 22 are bent is as follows. When the pads are to be replaced, one of the caliper support pins 2 is removed, and the caliper 3 is pivoted about the other caliper support pin 2 as shown in FIG. 4 and 5, and then the caliper 3 is returned to the previous position after replacement. At this time, since the upper end portion 21a and the lower end portion 22a are bent as described above, the piston boot 14 being damaged by the shielding plate 21.

Figure 6:
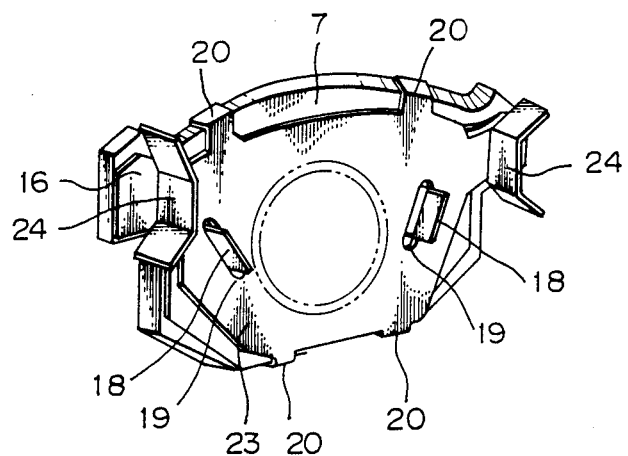
FIG. 6 is a perspective view of a shim in accordance with a second embodiment of the present invention, the shim being provided with shielding plates for protecting pin boots.
Figure 8:
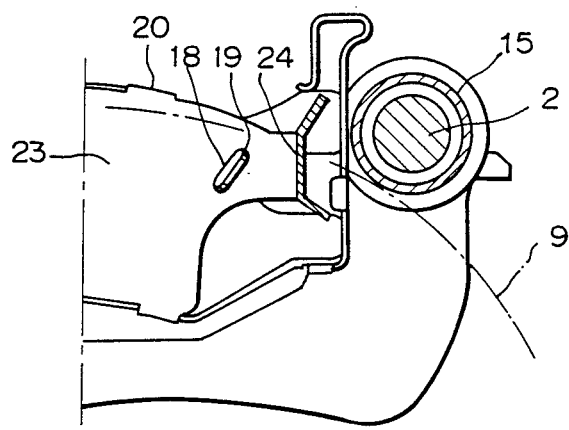
FIG. 8 is a sectional view taken along the line VIII—VIII of FIG. 7.

FIGS. 6 to 8 show in combination a second embodiment of the present invention in which shielding plates 24 are provided integrally with a cover shim member 23 for the purpose of protecting pin boots 15 from sparks generated by contact between the disc 9 and the inner pad 6, the pin boots 15 being provided to protect the slide portions of the caliper support pins 2. Each of the shielding plates 24 is bent so as to cover the corresponding pin boot 15 in order to intercept sparks and protect the pin boot 15 from adhesion of sparks tending to adhere thereto to thereby prevent the pin boot 15 from being burned and deteriorated. It should be noted that the second embodiment comprises the same members as those of the first embodiment except for the cover shim member 23.

Figure 9:
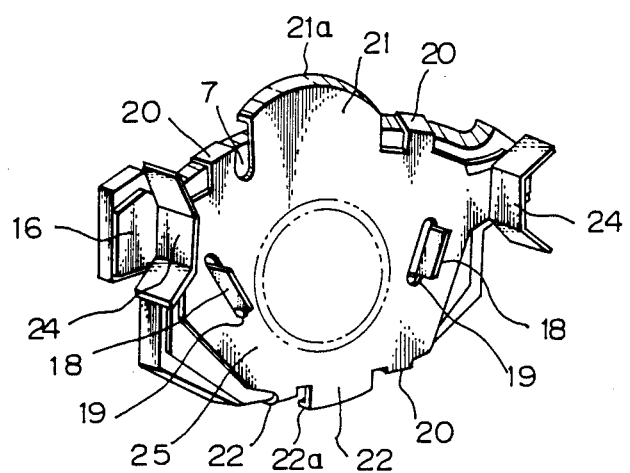
FIG. 9 is a perspective view of a shim in accordance with a third embodiment of the present invention, the shim being provided with shielding plates for protecting both piston and pin boots.

Although in the above-described first and second embodiments either the shielding plates 21, 22 for protecting the piston boot 14 or the shielding plates 24 for protecting the pin boots 15 are formed on the cover shim member 17 or 23, in a third embodiment shown in FIG. 9 the shielding plates 21, 22 and 24 are all provided on one cover shim member 25 so that the piston boot 14 and the pin boots 15 are protected at the same time.

As has been described above in detail, a boot which shields at least one slide portion, such as a piston boot or a pin boot, is shielded from a disc and a pad, thereby protecting the boot from scattering matter. Accordingly, it is possible to prevent sparks generated by contact between the disc and the pad from coming into contact with the boot and deteriorating it.

Further, since the shielding plate for shielding said boot can be formed integrally with the shim, there is no increase in the number of required parts and assembling steps, and it is therefore possible to obtain a disc brake according to the present invention without any rise in production costs being involved.

Although the present invention has been described through specific terms, it should be noted here that the described embodiments are not necessarily limitative and that various changes and modifications may be imparted thereto without departing from the scope of the invention which is limited solely by the appended claims.

What is claimed is:

1. A disc brake comprising:
    a carrier member;
    a disc, and a pair of friction pads each of which is disposed on a respective side of said disc,
    said friction pads slidably supported by said carrier member for sliding in an axial direction extending coincident with a central axis of said disc, one of said friction pads having a backing member;
    a caliper having a cylinder portion, said caliper slidably mounted to said carrier member and straddling said disc for sliding in said axial direction, and support pins slidably mounting said caliper to said carrier member, a sliding contact area over which said caliper is slidable being defined between the support pins and said caliper;
    a piston slidably mounted in the cylinder portion of said caliper for sliding along a sliding contact area defined between said cylinder portion and the piston, said piston facing said one of said respective friction pads at a side thereof opposite the side of said disc on which said one of said friction pads is disposed;
    boot means shielding at least one of said sliding contact areas;
    a shim means clamped to said backing member, said shim means consisting of an elastic shim member and a cover shim, said elastic shim member disposed between said cover shim and said backing member,
    said elastic shim member including a projection extending from a surface thereof, and
    said cover shim having a portion engaging the projection of said elastic shim member, a plurality of leg portions extending toward said backing member and clamping said shim means to said backing member, and a shielding portion shielding said boot means from matter generated by contact between said disc and said pads and scattering therefrom.

2. A disc brake as claimed in claim 1,
    wherein said boot means comprises a piston boot shielding said sliding contact area defined between said cylinder portion and the piston and pin boots shielding said sliding contact area defined between the support pins and said caliper.

3. A disc brake as claimed in claim 2,
    wherein said shielding portion has an outer end portion extending away from said piston boot.

4. A disc brake as claimed in claim 1,
    wherein said boot means comprises a piston boot shielding said sliding contact area defined between said cylinder portion and the piston, and said shielding portion has an outer end portion extending away from said piston boot.

* * * * *